Feb. 13, 1923. 1,445,584.
T. E. GROVE.
SURFACE TEST INDICATOR.
FILED MAR. 22, 1920.
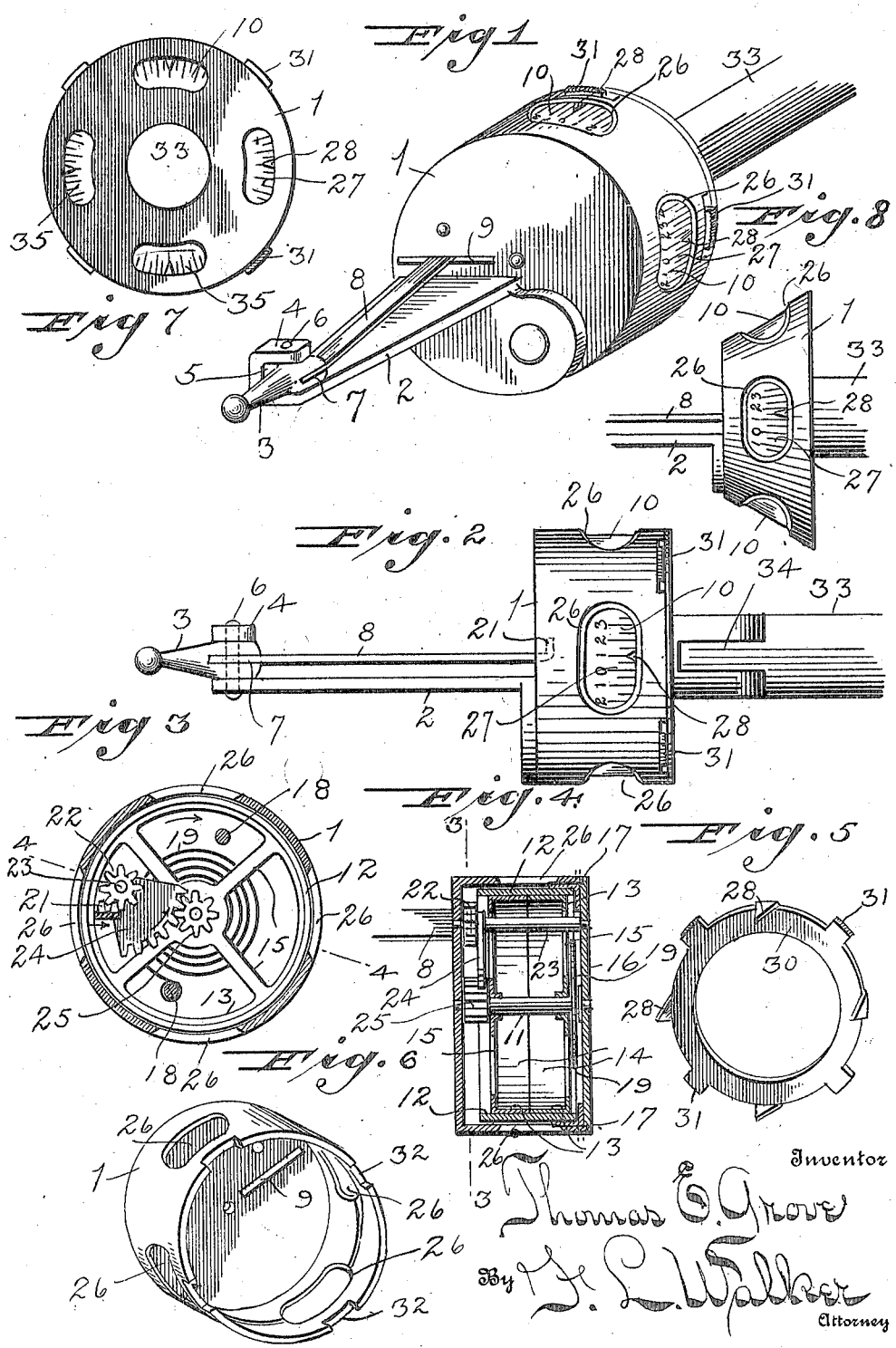

Patented Feb. 13, 1923.

1,445,584

UNITED STATES PATENT OFFICE.

THOMAS E. GROVE, OF DAYTON, OHIO.

SURFACE-TEST INDICATOR.

Application filed March 22, 1920. Serial No. 367,840.

*To all whom it may concern:*

Be it known that I, THOMAS E. GROVE, a citizen of the United States, residing at Dayton, in the county of Montgomery and State of Ohio, have invented certain new and useful Improvements in Surface-Test Indicators, of which the following is a specification.

This invention relates to measuring instruments, and particularly to surface test indicators, for measuring variations or undulations of a given surface and indicating these measurements or variations in amplified form.

The object of the invention is to simplify the structure, as well as the means and mode of operation of such instruments whereby they are not only cheapened in construction, but will be more sensitive and efficient in use, universal, in operation, automatic in action, accurate, and unlikely to get out of repair.

In the usual tool room or machine shop practice, it is necessary to take readings or measurements of different sides of a given piece of work. With the usual type of surface test indicators, much difficulty is experienced in observing the indications of the instrument, thru the fact that as the instrument is turned about the work, some indications must be read in inverted position, and when a bottom reading is to be had in many instances a mirror is necessary. The reading of the indications in inverted position, and by means of a mirror which gives a reversal of the image, leads to frequent mistakes, and inaccuracies, and it has long been recognized that a surface test indicator which could be read with equal facility in all positions of adjustment is a desirable adjunct to a tool room or machine shop equipment. To meet these requirements and provide an instrument of universal character, capable of being operated in various positions of adjustment, but in which the indicator scale will always be positioned to be readily observed by the operator, is a primary object of the present invention.

A further object of the invention, is to provide improved amplifying means for modifying the movement of the feeler by which variations will be accurately indicated without back-lash or undue vibrations.

With the above primary and other incidental objects in view as will more fully appear in the specification, the invention consists of the features of construction, the parts and combination thereof, and the mode of operation or their equivalents as hereinafter described and set forth in the claims.

Referring to the drawings, Fig. 1 is an enlarged perspective view of the assembled indicator, forming the subject matter hereof. Fig. 2 is a side elevation thereof. Fig. 3 is a transverse sectional view upon line 3—3 of Fig. 4. Fig. 4 is a diametrical sectional view upon line 4—4 of Fig. 3. Fig. 5 is a detail perspective view of the sychronizing ring carrying the gage pointers. Fig. 6 is a detail view of the notched edge of the housing to receive the radial ears of the sychronizing ring. Fig. 7 is an end elevation of a modification of the indicator means shown in the preceding figure. Fig. 8 is a further modification disclosing the conical head and indicator.

Like parts are indicated by similar characters of reference throughout the several views.

The instrument forming the subject matter hereof is provided with a plurality of sets of graduation marks, and pointers or indicating members which operate in unison to indicate the movement of the feeler. These indicating faces are disposed in different radial positions. The relative movement of the pointers and graduation marks of each indicating face occurs in unison to simultaneously indicate upon all of such differently positioned indicating faces in unison with the movement of the feelers.

In constructing the device there is employed, a cylindrical housing 1 from one face of which projects a rigid arm 2, which carries the oscillatory feeler 3. The rigid supporting arm 2 is provided at its extremity with a reversed ear 4, forming a bifurcation 5 within which the feeler 3 is pivotally mounted. The pivot stud 6 of the feeler 3 has a tight driven bearing within the feeler 3, and the amplifying arm hereafter mentioned, and has its loose journal bearing in the extremity of the arm 2 and the reverse ear 4. There is thus afforded a long bearing or widely separated journal connection for the feeler which tends to materially reduce side play and wear. It has heretofore been the most common practice to pivot the feeler upon a screw or stud stationarily fixed in the mounting about which the feeler oscillates. In such cases the bearing is reduced to the thickness of the feeler itself, whereas in the present case the bearing is in the mounting and not in the feeler, and hence being of greater extent maintains better alinement of the parts. The feeler 3 is bifurcated or provided with a saw kerf 7 in which is tightly gripped the end of an amplifying arm 8, which extends within the housing 1 thru a radial slot 9 in the head of said housing. The pivotal stud of the feeler extends thru the end of the amplifying arm 8, pivotally connecting these members one with the other. The contraction of the feeler upon the amplifying arm affords such frictional engagement as to cause the amplifying arm 8 to move in unison with the feeler 3, but upon application of sufficient pressure the feeler may be oscillated in relation with the arm 8 to different radial positions of adjustment. The feeler is thus readily adapted to different planes of operation. It will be understood that because of the great difference in the lengths of the feeler and amplifying arm 8, that any movement of the feeler is greatly multiplied upon the free end of the arm 8 within the housing 1. Located within the housing 1 is an oscillatory indicator drum 10, mounted for oscillatory movement with a main shaft 11, journaled in the opposite ends of the housing 1. The drum 10 preferably comprises a facing 12 of celluloid, bakelite, or other suitable material, which will facilitate the reading of the graduation marks. However, if desired the facing may be of metal. This facing has been shown as enclosing two oppositely disposed spiders 13 having inturned flanges 14 and each having four radial spokes or arms 15. For convenience of manufacture, these spiders are stamped from sheet metal, and mounted with their flanges 14 turned inward, or one toward the other. The spiders are securely fixed to the main shaft 11, and rotate therewith. Other forms of drum may be employed, but that shown and described affords a simple and economical method of manufacture. Access to the interior of the housing 1 is had thru the removal of one of the heads 16 thereof. This head 16 is peripherally rabbited as at 17 in Fig. 4 for engagement within the peripheral walls of the housing 1. The removable head is secured in position by studs or screws 18, extending thru the removable head and intermediate the spokes or arms 15 of the drum and engaging in the opposite integral head of the housing. These studs are so positioned as to permit a limited oscillatory movement of the drum, in either direction from its normal or zero position. Connected to the shaft 11 at one side of the drum is a spiral or retracting spring 19 the outer end of which is connected to one of the stud bolts 18. This spring tends to retract or rotate the drum in one direction until arrested by the engagement of the spider arms with the studs 18. The movement of the feeler 3 under the influence of variation in the work tends to rotate the drum in the opposite direction against the tension of such spring. This movement is effected thru a multiplying gear train. The inner end of the amplifying arm 8 is upturned as shown by dotted lines in Fig. 2 and is provided in such up-turned portion with a series of gear teeth. In practice two such teeth have been found to be sufficient, and such is the disclosure of the drawing. However, one or more teeth may be employed. The up-turned rack teeth 21 of the amplifying arm 8 mesh with a gear pinion 22 carried upon a transverse pinion shaft 23, journaled in the opposite heads of the housing 1. This pinion shaft 23, like the screw studs 18 extends between the arms or spokes of the drum spiders in such relation as to permit ample oscillation of the drum in either direction. Fixedly mounted upon the pinion shaft 23 adjacent to the pinion 22 is a gear sector 24, intermeshing with a gear pinion 25, mounted upon the drum shaft 11 and carrying with it in its rotation the indicating drum. As shown in the drawing, the housing 1 has been provided with four diametrically oppositely disposed apertures 26 thru which the indicating drum may be viewed. The drum is provided with four sets of graduation marks 27 in divisions substantially registering with the apertures 26. Associated with each set of graduations 27 visible thru the apertures 26, is a pointer or indicator 28. This indicator may be merely a mark upon the housing 1 but is preferably a pointer hand, adjustably mounted as hereafter described. The construction as described is such that the slightest movement of the feeler 3 due to undulations or irregularities of the tested surface, is transmitted thru the amplifying arm 8 to the pinion 22, giving to such pinion a materially increased degree of movement. The movement of the pinion 22 is again magnified or amplified by the gear sector 24, whereby the drum is rotated thru an increased degree of oscillatory movement, but always proportionate to the lesser degree of movement of the feeler 3. The rotation of the drum may be observed thru any or all of the vision apertures 26, and as there is a separate series of graduations associated with each aperture, the measurements may be read in any of these divisions. Thus in passing the instrument about a circular piece of work, whether the same be a locating button in jig work, or the interior of a bore, the measurement may be readily read thru the uppermost or first vision aperture. Upon turning the instrument thru a quarter rotation to take a side or lateral measurement, the indication may be read thru the second vision aperture which will then be uppermost. Upon turning the instrument thru a second quarter rotation to take a bottom reading, the indication will appear, of course simultaneously at all the vision apertures, but may be more easily read at the third aperture which will then be uppermost. The same condition will exist upon a further rotation of the instrument, to take an opposite side reading which will bring the fourth vision aperture uppermost. The instrument also facilitates the reading of the indication or measurement simultaneously by two or more persons. This enables an inspector to observe the work while the workman adjusts the device, both persons being able to follow the deviations of the instrument at all times.

In order to synchronize or adjust the indicator or pointer to zero, without changing the setting of the instrument in relation with the work, the pointers 28 are mounted upon a synchronizing ring 30, formed from sheet metal with the pointers 28 turned to position perpendicular to the plane of the ring and overlying the edge of the drum within the peripheral walls of the housing. The synchronizing ring 30 is formed with a plurality of radial ears 31, which engage within marginal notches 32 in the edge of the peripheral walls of the housing 1. The notches 32 are of somewhat greater length than the width of the ears 31 whereby the synchronizing ring 30 is permitted a limited rotary movement. This synchronizing ring lies in close frictional contact with the removable head of the housing, and is retained by this frictional engagement with the head and with the side walls of the housing in any position of adjustment within the range of the elongated notches 32. The ears 31 project slightly beyond the periphery of the head 1 and are knurled or roughened on their edges whereby they are readily engaged for turning the ring to bring the pointer 28 into exact alinement with the zero mark of the graduations 27. Any suitable form of support may be employed. In the drawing there has been shown a handle shaft 33, pivotally connected with a knuckle 34 carried by the removable head 16 of the housing 1. This knuckle or pivotal connection of the handle shaft enables the instrument to be turned to various angular positions in relation with the handle shaft which is mounted in the tool holder, surface gage, height gage, or other suitable support.

It is obvious that in lieu of graduations 27 upon the drum, the drum may carry a single indicator mark or pointer and the graduations 27 may be located upon the housing 1 at the margin of the vision aperture 26. This reversal of the indicator or pointer and the graduations is so obvious as not to necessitate illustration. In Fig. 7, there is shown a modification in which the graduations 27 are located upon the head or lateral face of the rotary drum and are visible thru apertures 35 in the head of the housing 1 instead of thru the periphery thereof. This construction enables a disc to be employed in lieu of the drum, and the depth of the housing may be materially decreased.

While the feature of multiple dials or indicative surfaces is a most desirable one, it is obvious that the device may be constructed with but a single observation space or vision aperture, in either of the types shown in Fig. 1 or Fig. 7. Therefore, while the multiplicity of simultaneous indication in different positions is important, it is not necessarily essential to the successful operation of the device.

Fig. 8 shows a further modification in which the main housing and indicator drum are of truncated conical form thus presenting the graduations at an inclined position. The mechanism and operation is otherwise as described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a surface test indicator of the character described, the combination with a movable contact member of an oscillatory indicator, an amplifying interconnecting means between the contact member and the indicator, and a plurality of pointers interconnected one with the other for adjustment in unison, independent of the oscillatory indicator, coacting with said indicator to indicate in amplified degree the movement of the contact member, simultaneously in a plurality of radially disposed positions.

2. In a surface test indicator of the character described, a casing having a plurality of vision apertures arranged in different radial positions, a movable indicator member within the casing and visible simultaneously thru the several apertures, a movable feeler member, movable in a single plane perpendicular to the plane of movement of the indicator, and an actuating lever between the feeler member and the indicator exerting uniform leverage in its various positions of adjustment whereby variations of the feeler member are simultaneously indicated uniformly at all of the vision apertures.

3. In a surface test indicator of the character described, a casing having therein a plurality of radially disposed vision apertures, an oscillatory drum mounted within the casing and visible thru the apertures, an oscillatory actuating arm for the drum movable in a single plane perpendicular to the plane of oscillation of the drum in unison with variations in the tested surface, the degree of variation of which is indicated by the movement of the drum, substantially as specified.

4. In a surface test indicator of the character described, a supporting frame, a movable feeler member mounted thereon, an amplifying mechanism, a movable multiple indicating member, an oscillatory arm, carrying gear teeth and controlled by the feeler member, a gear member, with which the teeth of said arm intermesh, a multiplying gear member operated in unison with the first mentioned gear member, and transferring amplifying movement to the indicator member, said multiple indicating member being adapted to simultaneously indicate the degree of movement of the feeler member in a plurality of different radially disposed positions.

5. In a surface test indicator of the character described, a supporting frame, a movable feeler member, amplifying mechanism, two relatively movable members, differentially adjusted by said amplifying mechanism, one of said members having thereon, a plurality of groups of graduations, and a plurality of pointers, one for each group of graduations, adjustably carried by the other member, and interconnected for adjustment in unison with which the graduation marks coact to simultaneously indicate the movement of the feeler at a plurality of different points spaced one from another.

6. In an indicator of the character described, a housing having a plurality of observation openings disposed in different radial positions, an oscillatory indicator within the housing having thereon groups of graduations, one group for each opening, a movable contact member, an amplifying connection between the contact member and the indicator whereby the indicator is oscillated through an amplified degree of movement by the movement of the contact member, and a series of normally stationary indicating pointers one for each opening interconnected one with the other for adjustment in unison independent of the indicator and contact.

7. In an indicator of the character described, a housing having therein a plurality of observation openings an oscillatory indicator within the housing having thereon a plurality of groups of graduations, one for each opening, a normally stationary pointer coacting with the movable graduations upon the indicator, a movable contact member and an amplifying interconnection between the contact member and indicator.

8. In an indicator of the character described, a movable contact member, an amplifying arm movable therewith, a series of rack teeth carried by said arm, and projecting perpendicular to the plane of movement of the amplifying arm, a gear pinion engaged by said teeth and an indicator oscillated by the actuation of said gear pinion, in proportion to the movement of the contact member.

9. In an indicator of the character described, a cylindrical housing having in the periphery thereof a plurality of observation openings, a cylindrical indicator mounted for oscillatory movement within said housing and having on its periphery groups of graduations, one group for each observation space, through which the graduations are visible, a movable contact member and an amplifying movement transmitting connection between the contact member and the indicating cylinder, whereby the cylinder will be oscillated in unison with the movement of the contact member but to greater degree.

10. In an indicator of the character described, a supporting structure, an oscillatory indicator and a movable contact feeler carried thereby, an amplifying lever movable in unison with the contact feeler, rack teeth carried by the lever and projecting perpendicular to the plane of oscillation thereof, a gear member engaged by the rack teeth and an operative connection between the gear member and the oscillatory indicator.

11. In an indicator of the character described, a supporting structure, an oscillatory indicator and a movable contact feeler carried thereby, said indicator and contact member being movable in planes at right angles to each other, an amplifying gear train actuating the oscillatory indicator, and an operative connection between the contact member and the initial gear member of the gear train.

12. In an indicator of the character described, an oscillatory indicator, a spring against the tension of which the indicator is movable, a pinion carried by the indicator, a gear segment, intermeshing with said gear pinion, a second gear pinion connected with the gear segment, an oscillatory arm having teeth engaging with the second mentioned pinion but movable in a plane perpendicular to the plane of rotation of the pinion, and a contact feeler controlling said arm.

In testimony whereof, I have hereunto set my hand this 4th day of March, A. D. 1920.

THOMAS E. GROVE.

Witnesses:
W. D. ANSPACH,
GEORGE C. HELMIG.